UNITED STATES PATENT OFFICE.

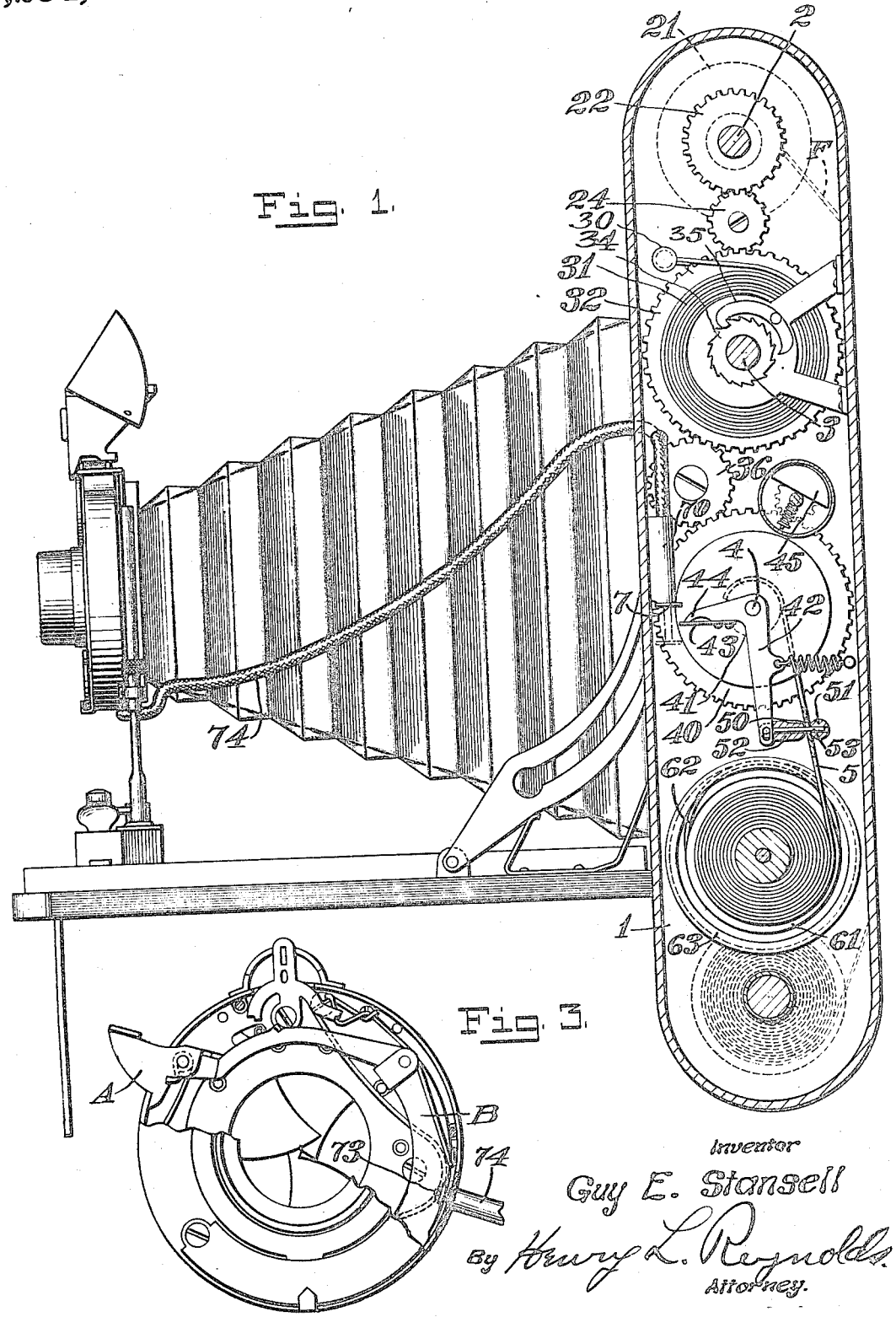

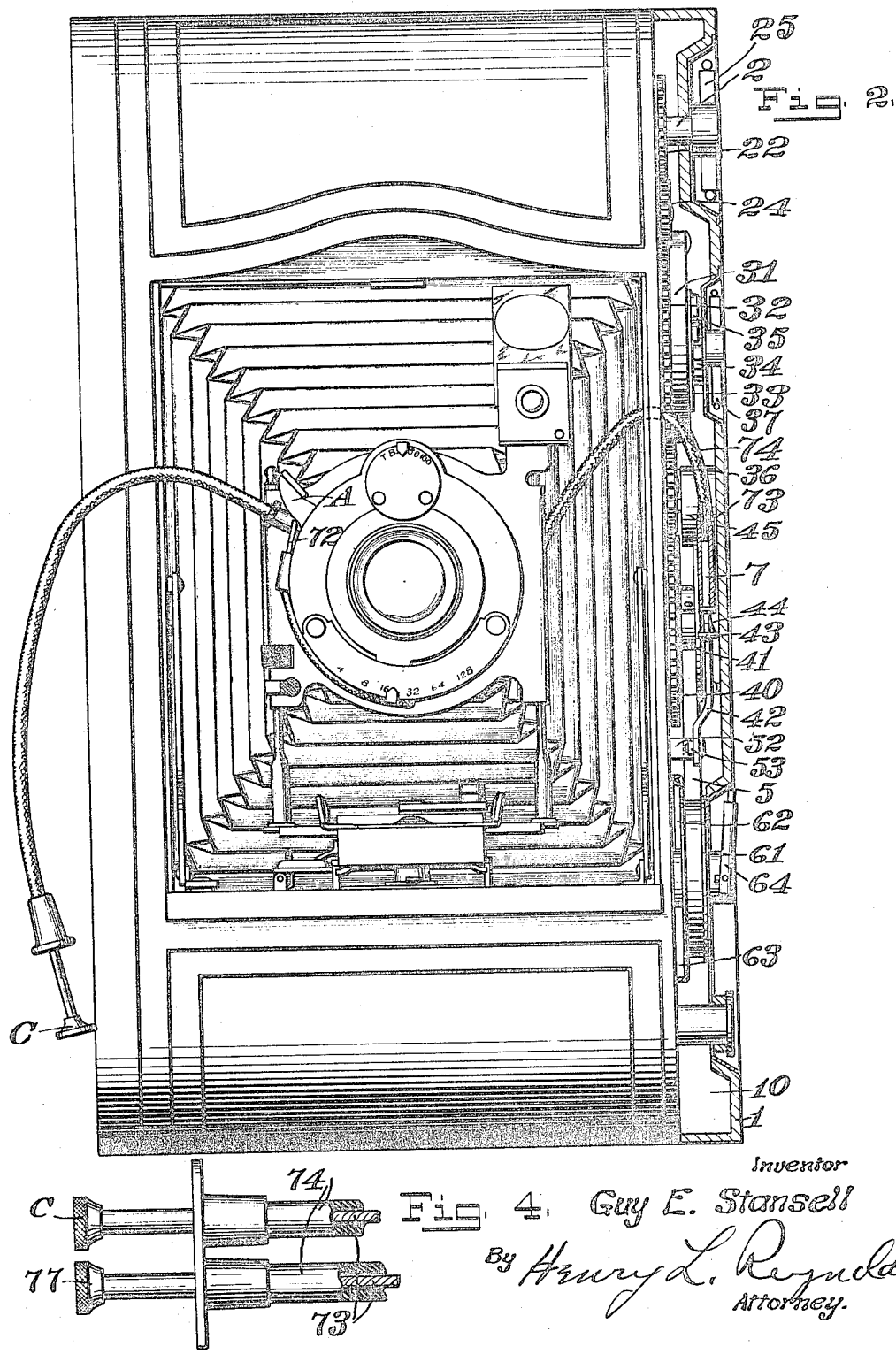

GUY E. STANSELL, OF SEATTLE, WASHINGTON.

AUTOMATIC FILM-FEED FOR CAMERAS.

1,254,373.   Specification of Letters Patent.   Patented Jan. 22, 1918.

Application filed August 19, 1916. Serial No. 115,778.

*To all whom it may concern:*

Be it known that I, GUY E. STANSELL, a citizen of the United States, and resident of Seattle, county of King, State of Washington, have invented certain new and useful Improvements in Automatic Film-Feeds for Cameras, of which the following is a specification.

My invention relates to automatic film feeds for cameras, and is intended for use particularly with small cameras such as are used by inexperienced or amateur photographers.

The object of my invention is to prevent the possibility of taking more than one exposure upon a given section of film; or, in other words, to prevent double exposures. This I accomplish by feeding forward the film automatically as soon as the exposure is completed.

My invention comprises the novel parts and combinations of parts which are shown in the accompanying drawings, and which will be hereinafter described in the specification and defined by the claims.

I have shown my invention, in the accompanying drawings, in its preferred form.

Figure 1 is a side elevation of the camera with one side in section to show my mechanism.

Fig. 2 is a front elevation of the camera, one side being in section to show the construction of my device.

Fig. 3 is a front elevation, with parts broken away, of a shutter mechanism showing modified means of attaching my device to the camera.

Fig. 4 is a view of a modified control for the film feed.

In the type of cameras used by amateur photographers, it often happens that the photographer forgets to wind up or remove the film section after having taken an exposure, and two exposures are taken upon the same section. By my invention I provide means for automatically winding up a section of film as soon as this has been exposed. These means may be operated by the shutter mechanism, or they may be under the direct control of the photographer.

One embodiment of my invention is shown in Figs. 1 and 2. At one side of the camera is provided a chamber 10, which I have shown as reaching from top to bottom of the casing. In this chamber, and upon an extension of the shaft 2, which is the winding shaft for film reel 21, carrying the film F, is mounted a gear 22.

A gear 32 is mounted upon a shaft 3 so that it will turn thereon if sufficient force is applied, but is engaged thereby to be turned by any suitable means, as by friction or by a ratchet (not shown). A spiral spring 31 has one end secured to the shaft 3, and its other end to the casing at 30. This constitutes the spring motor which actuates the feed mechanism; it is connected to the film reel shaft 2 by means of an idler gear 24.

In order to hold the spring when it is wound up, I may provide a washer 33 upon shaft 3, and fixed relative to the casing. Upon the washer 33 are mounted a ratchet wheel 34 and pawl 35. The usual winding key 25 is provided upon the end of shaft 2 for winding up the film in the usual manner, and a similar key 37 is secured upon the end of shaft 3 outside of the casing 1.

Upon the shaft 4, within the chamber 10, is mounted a gear wheel 40. The shaft 4 also carries a drum 41. The diameter of this drum 41 is preferably equal to the diameter of the film reel 21, though the proportion of this drum and its associated parts may be varied to suit conditions. A second drum 61 is also mounted within the chamber. The diameter of this drum also is preferably equal to the diameter of drum 41 and of film reel 21.

Secured upon these two drums 41 and 61 is a flexible member, herein shown as a tape 5. This tape is preferably of the same thickness as the sensitive film, although, as noted above, this is not material. Between the drums 41 and 61 the tape passes between the rounded surfaces of guides 51 and 52. A pin 53 passes through alined holes in these guides 51 and 52, and through perforations 50 in the tape. These perforations, preferably, are arranged at intervals equal or corresponding to the length of the film section. One arm of a bell-crank lever 42 engages the pin 53 to withdraw the same from the perforations 50. Upon the other arm of the member 42 is secured a leaf spring 43. A stop 44 is provided upon the lever at one side of the leaf spring.

Secured upon the casing 1 adjacent the spring 43 is a plunger 7 mounted to reciprocate in a casing 70. As this plunger is forced from its casing it engages the end of the spring 43, which yields and permits passage of the head of the plunger without affecting the position of the lever 42. Upon the return of the plunger 7 its head engages the spring 43, and as this is supported by the arm 44 of lever 42, the lever is moved to free the pin 53 carried thereby from the hole in the tape 5. Further movement of plunger 7 carries its head past the end of spring 43 and the spring 46 returns the bell crank lever 42 to its normal position.

The gear 40 is connected to the gear 32 by means of an idler 36, so that when the pin 53 is withdrawn from the perforations 50 the action of the spring 31 will cause the drum 41 to be rotated to wind up the tape 5 thereon. When the tape 5 has been moved a distance corresponding to the length of a film exposure, the next hole 50 therein will engage the pin 53 and its further feed, and the like feed of the film will be stopped.

Any suitable governor, as 45, may be journaled in the casing to govern the speed of rotation of the gear 40 and drum 41. A spring 62 bearing upon guides 63, or any suitable device, may be provided to lessen the speed of the drum 61. As herein shown, this governor consists of a mass rotating off center, which is pulled outward against the action of a spring by centrifugal force. The friction between this rotating mass and the fixed surrounding casing slows down the drum 41.

Any suitable means for operating the plunger 7 may be employed. In my preferred construction I employ a device similar to that which operates the shutter mechanism of the camera. A plunger 72 is mounted upon the shutter adjacent the operating lever A and is engaged thereby. Upon the depression of the lever A the plunger 72 is depressed, and motion is communicated to the plunger 7 by means of a cable 73 operating in the flexible tube 74.

Another means of operating this plunger 7 is shown in Fig. 3. An end of the cable 73 is secured to the lever B within the shutter casing. As this lever is rocked by the operating lever A, the cable 73 is pulled inward. The casing 70 being reversed, this will cause the plunger 7 to act in the manner above described. Still another means of operating the plunger is shown in Fig. 4. A separate button 77 is placed alongside of the button C which operates the shutter. The operation of the film feed is, in this form, under the direct control of the operator. After the exposure is completed, the operator presses the button 77, and the exposed film section is removed.

When snap shots are being taken the photographer presses upon the button C. This causes lever A to be depressed by the action of the shutter mechanism and plunger 72 is thereby depressed. This causes plunger 7 to be protruded from the casing 70, and as the button C is withdrawn the plunger 7 returns to its normal position. This motion withdraws the pin 53 from the perforations 50 and permits the tape to wind upon the drum 41 until the pin 53 engages in the next perforation 50. The film is not moved until the exposure has been completed, but it is moved immediately after such exposure, thereby preventing any possibility of a double exposure. When taking bulb exposures, the operating lever A remains depressed as long as the shutter remains open. The lever 42 is not rocked until the plunger 7 returns to its normal position. The film, therefore, cannot be fed forward until after the exposure is completed. In making time exposures the operating lever A remains partially depressed until the button C is pressed for the second time. The parts are so arranged that the plunger 7 cannot engage the spring 43 to release the pin 53 until the plunger 7 is returning to its normal position.

After a film has been completely exposed it is removed and the tape rewound upon the drum 61 by means of a key 64, which extends outside of the casing 1. The spring 31 may be rewound by means of a key 37, and the tension thereon regulated by means of this key and the dog 35.

What I claim as my invention is:

1. In combination, an automatic film feed for cameras, a feed control comprising a tape actuated by the film feed in conformity with the film and having spaced stops, a catch adapted to engage said stops and arrest the film feed, and means for releasing said catch.

2. In combination, an automatic film feed for cameras, a feed control comprising a tape actuated by the film feed in conformity with the film and having spaced stops, a spring held catch normally engaging said stops, and means for automatically releasing said catch at a predetermined point.

3. A film camera comprising automatically acting film feeding mechanism, a tape-like controlling member separate from but connected to be operated in conformity with the film and having holes therein spaced to conform to single exposure lengths of the film, a catch normally active to enter said holes, and means for releasing said catch.

4. In combination with a film camera having two film reels, two drums adapted to turn with said reels, a flexible member secured upon said drums and adapted to be wound from one drum upon the other, means for automatically turning one of said drums to wind the flexible member thereon, a governor adapted to regulate the speed of rotation of said drums, means for stopping said flexible member and the film at predetermined points, and means for releasing said flexible member.

5. In combination with a film camera having two film reels, two drums of equal diameter with said film reels and adapted to turn therewith, a tape secured to said drums and adapted to be wound from one drum to another, said tape being of equal thickness with the film, means for automatically turning one of said drums to wind the tape thereon, means for stopping said tape and the film at predetermined points, and means for releasing said tape and the film.

6. In combination with a film camera having two film reels, two drums of equal diameter with said film reels and adapted to turn therewith, a tape secured to said drums and adapted to be wound from one drum to another, said tape being of equal thickness with the film, means for automatically turning one of said drums to wind the tape thereon, a governor to regulate the speed of rotation of said drums, means for stopping the film and the tape at predetermined points, and means for releasing said film and the tape.

7. In combination with a film camera having two film reels, two drums adapted to turn with said reels, a tape secured upon said drums and adapted to be wound from one drum to another, said tape having perforations at intervals corresponding to the intervals between the several exposures upon the film, a pin adapted to engage in said perforations, to stop the tape and film, means for automatically winding the tape upon a drum, and means for withdrawing said pin.

8. In combination with a film camera having two film reels, two drums adapted to turn with said reels, a tape secured upon said drums and adapted to be wound from one drum upon the other, a pin adapted to engage said tape to hold the same, means for automatically rotating said reels and drums to wind up the film and tape, a bell-crank lever engaging said pin at one end, a plunger mounted for reciprocation adjacent the other end of said bell-crank lever, and means controllable by the operator for reciprocating said plunger, said bell-crank lever being adapted to engage said plunger upon its return motion to withdraw said pin.

9. In combination with a film camera having two film reels, two drums adapted to turn with said reels, a tape secured upon said drums and adapted to be wound from one drum upon the other, a pin adapted to engage said tape to hold the same, means for automatically rotating said reels and drums to wind up the film and tape, a bell-crank lever engaging said pin at one end, a plunger mounted for reciprocation adjacent the other end of said bell-crank lever, means controllable by the operator for reciprocating said plunger, a leaf spring upon this end of the bell-crank lever, and a stop for said spring upon the side of the lever toward the normal position of the plunger, said plunger being adapted to engage the spring upon its return motion to thereby withdraw said pin.

Signed at Seattle, Washington, this 12th day of August, 1916.

GUY E. STANSELL.